(12) United States Patent
Dooley et al.

(10) Patent No.: US 7,288,923 B1
(45) Date of Patent: Oct. 30, 2007

(54) VOLTAGE-LIMITED ELECTRIC MACHINE

(75) Inventors: Kevin Allan Dooley, Mississauga (CA); Joshua David Bell, Toronto (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 0 days.

(21) Appl. No.: 11/379,620

(22) Filed: Apr. 21, 2006

(51) Int. Cl.
- H02P 9/00 (2006.01)
- H02K 1/00 (2006.01)
- H02K 3/00 (2006.01)
- H02K 3/04 (2006.01)
- H02K 17/00 (2006.01)

(52) U.S. Cl. .................. 322/89; 310/179; 310/208; 310/216

(58) Field of Classification Search ........ 310/179–180, 310/207–208, 201, 216; 322/89
See application file for complete search history.

(56) References Cited

U.S. PATENT DOCUMENTS

| | | | |
|---|---|---|---|
| 1,685,970 A | 10/1928 | Townend et al. | 322/63 |
| 1,723,090 A | 8/1929 | Stevenson, Jr. | 322/28 |
| 2,291,008 A | 7/1942 | Tymer | 310/184 |
| 2,540,202 A | 2/1951 | Gostow | 322/59 |
| 2,564,320 A | 8/1951 | Brainard | 322/28 |
| 2,679,605 A * | 5/1954 | Kilgore | 310/111 |
| 2,886,762 A | 5/1959 | Potasek | 322/24 |
| 2,939,069 A | 5/1960 | Dvoracek | 322/57 |
| 3,017,562 A | 1/1962 | Duane | 322/46 |
| 3,093,779 A * | 6/1963 | Hansen et al. | 318/143 |
| 3,214,675 A | 10/1965 | Foster | 322/46 |
| 3,243,688 A | 3/1966 | Brundage | 322/57 |
| 3,344,338 A | 9/1967 | Sparrow | 322/75 |
| 3,443,201 A | 5/1969 | Williams | 322/28 |
| 3,510,752 A | 5/1970 | Raver et al. | 322/28 |
| 3,569,809 A * | 3/1971 | Comer | 388/806 |
| 3,671,788 A | 6/1972 | Knudson et al. | 310/156.55 |
| 3,753,068 A | 8/1973 | Walker, Jr. | 388/803 |
| 3,812,441 A | 5/1974 | Sakamoto et al. | 335/208 |
| 3,866,110 A | 2/1975 | Ruggeri | 322/57 |
| 3,961,211 A | 6/1976 | Vergues | 310/68 C |
| 3,986,062 A | 10/1976 | Morrill | 310/172 |
| 4,001,665 A * | 1/1977 | Wisner et al. | 363/93 |
| 4,004,202 A | 1/1977 | Davis | 318/138 |

(Continued)

FOREIGN PATENT DOCUMENTS

CA   2051626 A1   8/1991

(Continued)

OTHER PUBLICATIONS

General Electric Company, "150Kva Samarium Cobalt VSCF Startar/Generator Electrical System, Final Technical Report", 1979.

(Continued)

*Primary Examiner*—Darren Schuberg
*Assistant Examiner*—Pedro J. Cuevas
(74) *Attorney, Agent, or Firm*—Ogilvy Renault LLP (57) ABSTRACT

An electric alternator having a rotor, stator and at least one winding in the stator adapted to conduct a current, the machine also having and first and second magnetic circuits around different portions of the winding which may be configured relative to one another to control generated output voltage of the winding.

13 Claims, 5 Drawing Sheets

U.S. PATENT DOCUMENTS

| | | | |
|---|---|---|---|
| 4,032,807 A | 6/1977 | Richter | 310/178 |
| 4,039,910 A | 8/1977 | Chirgwin | 318/807 |
| 4,138,629 A | 2/1979 | Miller et al. | 318/140 |
| 4,143,307 A * | 3/1979 | Hansen et al. | 318/16 |
| 4,237,395 A | 12/1980 | Loudermilk | 310/113 |
| 4,250,128 A | 2/1981 | Meckling | 264/429 |
| 4,305,031 A | 12/1981 | Wharton | 322/29 |
| 4,346,335 A | 8/1982 | McInnis | 388/803 |
| 4,392,072 A | 7/1983 | Rosenberry | 310/216 |
| 4,401,906 A | 8/1983 | Isobe et al. | 310/156.08 |
| 4,445,061 A | 4/1984 | Jackson, Jr. | 310/156.08 |
| 4,492,902 A | 1/1985 | Ficken et al. | 318/254 |
| 4,503,377 A | 3/1985 | Kitabayashi et al. | 318/807 |
| 4,511,831 A | 4/1985 | McInnis | 388/803 |
| 4,547,713 A | 10/1985 | Langley et al. | 318/254 |
| 4,562,399 A | 12/1985 | Fisher | 322/94 |
| 4,566,179 A * | 1/1986 | Sawyer et al. | 29/596 |
| 4,605,874 A | 8/1986 | Whiteley | 310/268 |
| 4,617,726 A | 10/1986 | Denk | 29/598 |
| 4,625,135 A | 11/1986 | Kasabian | 310/156.28 |
| 4,638,201 A | 1/1987 | Feigel | 310/216 |
| 4,656,379 A | 4/1987 | McCarty | 310/181 |
| 4,709,180 A | 11/1987 | Denk | 310/179 |
| 4,713,570 A | 12/1987 | Mastromattei | 310/181 |
| 4,763,034 A | 8/1988 | Gamble | 310/181 |
| 4,799,578 A | 1/1989 | Matsushita | 192/84.961 |
| 4,851,758 A | 7/1989 | Osada et al. | 322/63 |
| 4,852,245 A | 8/1989 | Denk | 29/596 |
| 4,887,020 A | 12/1989 | Graham | 322/63 |
| 4,896,756 A | 1/1990 | Matsushita | 192/84.961 |
| 4,897,570 A | 1/1990 | Ishikawa et al. | 310/154.17 |
| 4,914,317 A * | 4/1990 | Agiman | 327/108 |
| 4,924,125 A | 5/1990 | Clark | 310/67 R |
| 5,030,877 A | 7/1991 | Denk | 290/52 |
| 5,184,040 A | 2/1993 | Lim | 310/114 |
| 5,235,231 A | 8/1993 | Hisey | 310/259 |
| 5,245,238 A | 9/1993 | Lynch et al. | 310/116 |
| 5,260,642 A | 11/1993 | Huss | 322/51 |
| 5,304,883 A | 4/1994 | Denk | 310/180 |
| 5,350,991 A | 9/1994 | Bae | 318/727 |
| 5,397,948 A | 3/1995 | Zoerner et al. | 310/46 |
| 5,428,267 A * | 6/1995 | Peil | 315/224 |
| 5,519,275 A | 5/1996 | Scott et al. | 310/112 |
| 5,555,722 A | 9/1996 | Mehr-Ayin et al. | 60/788 |
| 5,585,682 A | 12/1996 | Konicek et al. | 310/89 |
| 5,742,106 A | 4/1998 | Muraji | 310/36 |
| 5,770,901 A | 6/1998 | Niimi et al. | 310/52 |
| 5,793,137 A | 8/1998 | Smith | 310/114 |
| 5,798,596 A | 8/1998 | Lordo | 310/261 |
| 5,822,150 A | 10/1998 | Kelsic | 360/98.07 |
| 5,825,597 A | 10/1998 | Young | 361/31 |
| 5,834,874 A | 11/1998 | Krueger et al. | 310/191 |
| 5,838,080 A | 11/1998 | Couderchon et al. | 310/49 R |
| 5,903,115 A | 5/1999 | Taylor | 318/34 |
| 5,912,522 A | 6/1999 | Rivera | 310/184 |
| 5,917,248 A | 6/1999 | Seguchi et al. | 290/31 |
| 5,925,999 A | 7/1999 | Lakerdas et al. | 318/496 |
| 5,936,325 A | 8/1999 | Permuy | 310/162 |
| 5,942,829 A | 8/1999 | Huynh | 310/178 |
| 5,952,757 A | 9/1999 | Boyd, Jr. | 310/156.81 |
| 5,953,811 A | 9/1999 | Sears et al. | 388/811 |
| 5,955,809 A | 9/1999 | Shah | 310/198 |
| 5,962,938 A | 10/1999 | Bobay et al. | 310/67 R |
| 6,011,338 A | 1/2000 | Bell et al. | 310/184 |
| 6,097,124 A | 8/2000 | Rao et al. | 310/156.26 |
| 6,100,620 A | 8/2000 | Radovsky | 310/268 |
| 6,114,784 A | 9/2000 | Nakano | 310/59 |
| 6,154,019 A | 11/2000 | Valdemarsson et al. | 323/361 |
| 6,239,532 B1 | 5/2001 | Hollenbeck et al. | 310/257 |
| 6,242,840 B1 | 6/2001 | Denk et al. | 310/254 |
| 6,255,756 B1 | 7/2001 | Richter | 310/208 |
| 6,271,613 B1 | 8/2001 | Akemakou et al. | 310/181 |
| 6,286,199 B1 | 9/2001 | Bobay et al. | 29/596 |
| 6,313,560 B1 | 11/2001 | Dooley | 310/259 |
| 6,323,625 B1 | 11/2001 | Bhargava | 322/32 |
| 6,331,760 B1 * | 12/2001 | McLane, Jr. | 318/767 |
| 6,342,746 B1 | 1/2002 | Flynn | 310/181 |
| 6,373,162 B1 | 4/2002 | Liang et al. | 310/156.53 |
| 6,429,615 B2 | 8/2002 | Schmider et al. | 318/254 |
| 6,437,529 B1 | 8/2002 | Brown | 318/439 |
| 6,504,261 B2 | 1/2003 | Fogarty et al. | 290/52 |
| 6,525,504 B1 | 2/2003 | Nygren et al. | 318/700 |
| 6,541,887 B2 | 4/2003 | Kawamura | 310/190 |
| 6,664,696 B1 * | 12/2003 | Pham et al. | 310/216 |
| 6,707,638 B2 | 3/2004 | Mayne | 310/152 |
| 6,781,331 B2 | 8/2004 | Mokri et al. | 318/157 |
| 6,788,031 B2 | 9/2004 | Pendell | |
| 6,922,037 B2 * | 7/2005 | Edelson | 318/801 |
| 6,965,183 B2 | 11/2005 | Dooley | 310/201 |
| 7,005,828 B2 * | 2/2006 | Karikomi | 318/801 |
| 7,126,313 B2 | 10/2006 | Dooley | 322/44 |
| 7,180,216 B2 * | 2/2007 | Hirzel et al. | 310/168 |
| 2002/0039298 A1 * | 4/2002 | Riggio et al. | 363/22 |
| 2002/0047455 A1 | 4/2002 | Dhyanchand et al. | 310/211 |
| 2002/0084705 A1 | 7/2002 | Kawamura | 310/68 R |
| 2002/0084715 A1 | 7/2002 | Kakuta et al. | 310/216 |
| 2002/0089863 A1 * | 7/2002 | Yasumura | 363/21.14 |
| 2002/0093252 A1 | 7/2002 | Kang et al. | 310/12 |
| 2002/0093264 A1 * | 7/2002 | Raith et al. | 310/179 |
| 2002/0149281 A1 | 10/2002 | Saint-Michel et al. | 310/179 |
| 2002/0176263 A1 * | 11/2002 | Riggio et al. | 363/24 |
| 2003/0173931 A1 * | 9/2003 | Edelson | 318/801 |
| 2003/0205990 A1 * | 11/2003 | Wittenbreder, Jr. | 323/222 |
| 2004/0100222 A1 * | 5/2004 | Karikomi | 318/801 |
| 2004/0183392 A1 | 9/2004 | Dooley | 310/216 |
| 2004/0239202 A1 | 12/2004 | Dooley | 310/184 |
| 2005/0146307 A1 | 7/2005 | Dooley et al. | 322/28 |
| 2005/0212374 A1 * | 9/2005 | Mitcham | 310/216 |
| 2005/0276084 A1 * | 12/2005 | Wai et al. | 363/98 |
| 2006/0104097 A1 * | 5/2006 | Tsuruya | 363/55 |
| 2006/0113967 A1 * | 6/2006 | Dooley | 322/57 |
| 2006/0186863 A1 * | 8/2006 | Yamamoto et al. | 322/28 |
| 2006/0226721 A1 * | 10/2006 | Dooley et al. | 310/113 |
| 2006/0273767 A1 * | 12/2006 | Fujii | 323/224 |
| 2007/0024249 A1 | 2/2007 | Dooley | 322/44 |

FOREIGN PATENT DOCUMENTS

| | | |
|---|---|---|
| DE | 3430590 A1 | 2/1986 |
| DE | 3430188 C2 | 8/1989 |
| EP | 368930 B1 | 4/1994 |
| EP | 750806 B1 | 8/1996 |
| EP | 754365 B1 | 2/1998 |
| EP | 1 235 327 A2 | 8/2002 |
| EP | 1 235 327 A3 | 8/2002 |
| FR | 1555855 | 12/1966 |
| FR | 2618616 | 7/1987 |
| GB | 2 184 609 A | 6/1987 |
| JP | 55-061625 | 5/1980 |
| JP | 61231857 | 10/1986 |
| JP | 1-136938 | 5/1989 |
| JP | 1-138936 | 5/1989 |
| JP | 6 237 561 | 8/1994 |
| JP | 7 039122 A | 2/1995 |
| JP | 7 075213 A | 3/1995 |
| JP | 9 205743 | 8/1997 |
| JP | 2001-16887 | 1/2001 |
| JP | 2002-191158 | 7/2002 |
| JP | 2002-291216 | 10/2002 |
| JP | 2003-102159 | 4/2003 |
| WO | WO90/10971 | 9/1990 |
| WO | 91-12647 | 8/1991 |
| WO | 99/09638 | 2/1999 |
| WO | 99/66624 | 12/1999 |

| WO | 02/09260 A1 | 1/2002 |
| WO | 03/003546 A1 | 1/2003 |
| WO | WO 03/023939 A1 | 3/2003 |
| WO | 03/028202 A1 | 4/2003 |

OTHER PUBLICATIONS

M. Cronin, "The All-Electric Airplane as Energy Efficient Transport", SAE Journal, 1980.

Richtar, E. et al., "Jet Engine Integrated Generator", Amcn Inst. Aeronautics & Astronautics, 1981.

B. Dishner et al., "A Novel Electromechanical Approach to Constant Frequency Power Generation", IEEE Journal, 1989.

M. Cronin, "The All-Electric Airplane Revisited", SAE Technical Series, 1989.

SAE Technical Paper Series 892252, Application Considerations for Integral Gas Turbine Electric Starter/Generator revisited. 1989.

The Applicability of Electrically Driven Accessories for Turboshaft Engines, 1993.

R. Nims, "Development of an Oilless, Gearless, and Bleedable under Armour Power Unit", ASME paper, 1995.

Richter et al., "Preliminary Design of an Internal Starter/Generator for Aplication in the F110-129 Engine", SAE Aerospace Atlantic Conference, 1995.

R. Nims, "Armor-plated audiary power", Mechanical Engineering, 1997.

PCT International Search Report for International application No. PCT/CA2004/000689 mailed Sep. 16, 2004.

International Search Report PCT/CA2005/001657, Feb. 22, 2006.

U.S. Appl. No. 11/420,602, filed May 26, 2006, by Kevin Allan Dooley.

U.S. Appl. No. 11/533,548, filed Sep. 20, 2006, by Kevin Allan Dooley.

International Search Report, PCT/CA2007/000518, Jun. 26, 2007.

* cited by examiner

VOLTAGE-LIMITED ELECTRIC MACHINE

TECHNICAL FIELD

The invention relates to electric machines capable of operating at least as alternators, and in particular to the control of such machines.

BACKGROUND

The output voltage and frequency of PM alternators is essentially determined by the rotor speed, which present challenges where the rotor speed cannot be independently controlled. Also, controllability in low- or no-load conditions requires using regulation apparatus, such as a shunt regulation system, to draw current from the machine if the voltage increases above a given maximum allowable value. But these systems add weight and complexity. It would therefore be desirable to improve the controllability of electric alternators under a low or no-load condition.

SUMMARY

In one aspect, the present invention provides a method of controlling an output voltage in a machine operable as an electric alternator/generator, the machine comprising a rotor and stator assembly, the assembly having a stator including at least a first winding, the assembly also having first and second magnetic circuits and a saturation control device, the first magnetic circuit including the rotor and encircling at least a first portion of the first winding, the second magnetic circuit encircling at least a second portion of the first winding remote from the first magnetic circuit, the first and second magnetic circuits coupled when current flows in the first winding, the second magnetic circuit including a portion which is selectively magnetically saturable, the saturation control device being operatively associated with the magnetically saturable portion of the second circuit and operable to controllably vary a saturation level of said saturable portion, the method comprising: reducing the saturation of the magnetically saturable portion as an output current of the machine reduces towards zero during a low or no-load condition; preventing an output voltage of the machine from rising above a threshold value during the low/no-load condition by allowing sufficient flux to leave the first magnetic circuit and circulate through the magnetically saturable portion when in an unsaturated condition to induce a reducing voltage in second portion of the first winding subtractive from the output voltage.

In another aspect, the invention provides a method of providing an electric alternator, the method comprising: providing an alternator having a rotor, a stator and at least a first winding providing alternator output power, the stator having a plurality of first slots and second slots circumferentially around the stator, the first slots located closer to the rotor than the second slots, the first slots having a portion of the first winding disposed therein, the second slots having another portion of the first winding disposed therein, the stator defining a first magnetic circuit path around the first slots and a second magnetic path around the second slots, the first magnetic circuit path in use conducting rotor magnetic flux to induce a first voltage in the first winding, the second magnetic circuit path in use conducting rotor magnetic flux to induce a second voltage in the first winding, the second voltage opposite in direction to the first voltage, the stator having first and second magnetic permeabilities associated with the first and second magnetic circuit paths; determining a maximum allowable output voltage of the alternator mode when operating under a low or no-load condition; configuring the stator by selecting relative permeabilities of the first and second magnetic circuits such that in use the induced second voltage is sufficient large relative to the induced first voltage so as to prevent the first voltage from exceeding the maximum allowable output voltage.

In another aspect, the invention provides an electric alternator comprising a rotor, a stator and at least a first stator winding providing alternator output power to a load, the stator having a plurality of first slots and second slots circumferentially around the stator, the first slots located closer to the rotor than the second slots, the first slots having a portion of the first winding disposed therein, the second slots having another portion of the first winding disposed therein and wound oppositely relative to the portion in the first slots, the stator defining a first magnetic circuit path around the first slots and a second magnetic circuit path around the second slots, the second path outside of the first magnetic circuit path, the first magnetic circuit path adapted to conduct rotor magnetic flux to induce a first voltage in the first winding, the second magnetic circuit path adapted to conduct rotor magnetic flux to induce a second voltage in the first winding, the second voltage opposite in direction to the first voltage, the stator having first and second magnetic permeabilities associated with the first and second magnetic circuit paths, the relative permeabilities selected such that in use the induced second voltage is sufficiently large relative to the induced first voltage so as to prevent the first voltage from exceeding a pre-determined maximum allowable output voltage.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
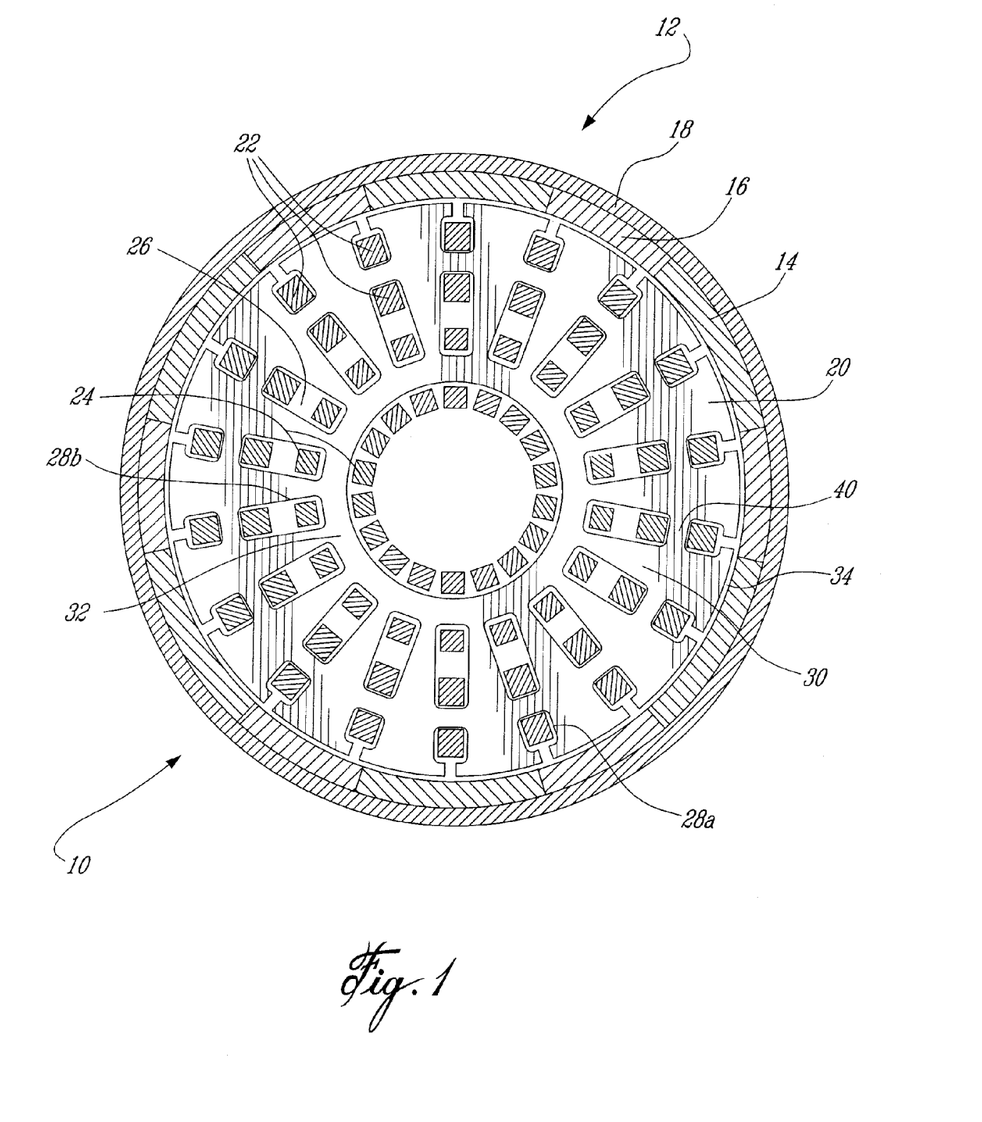
FIG. 1 is a cross-sectional view of an example of an alternator/motor machine according to the present invention.
Figure 2:
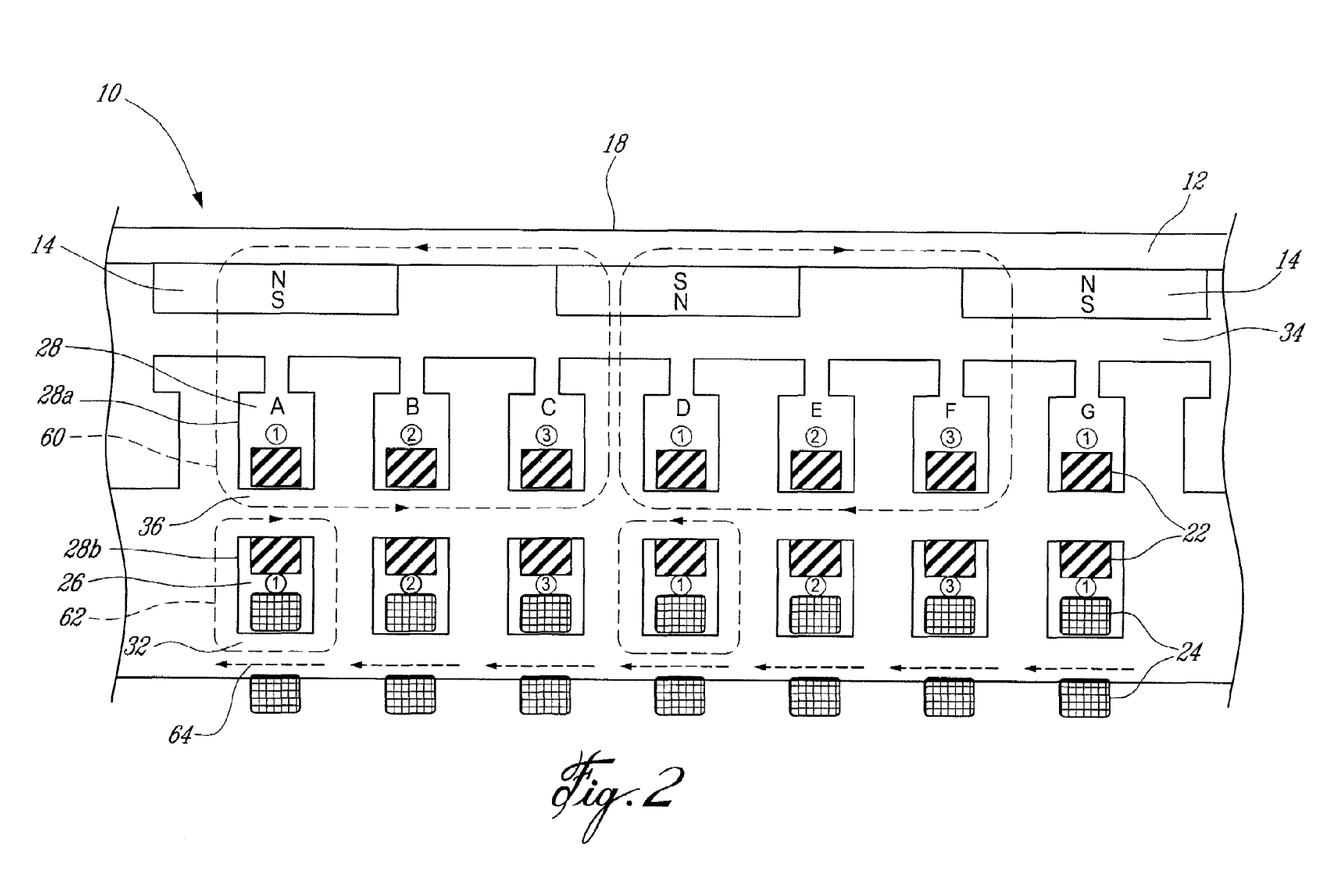
FIG. 2 is a somewhat schematic cross-sectional view of a portion of the machine shown in FIG. 1.

Referring first to FIGS. 1 and 2, a portion of a permanent magnet (PM) electric machine 10 according to an example of the present invention is depicted. For ease of illustration and description, FIG. 2 shows a linear arrangement of the electric machine 10 of FIG. 1. However, it is to be understood that the machine 10 is generally preferred to have the circular architecture of FIG. 1, with an inside or outside rotor. It will also be understood by the skilled reader that FIGS. 1 and 2, as well as the accompanying description, are schematic in nature, and that many routine details of the design have been omitted for clarity. The machine 10, shown in FIG. 1 as an outside rotor machine in this embodiment, is configured as an alternator to generate electrical power, and optionally also as a motor to convert electrical power into mechanical torque.

The machine 10 has a rotor 12 with permanent magnets 14, optionally interposed between spacers 16, which rotor 12 is mounted for rotation relative to a stator 20. A retention sleeve 18 is provided to hold the permanent magnets 14 and the spacers 16. It also provides the magnetic path behind the magnets 14. Stator 20 has at least one power winding 22 and preferably at least one control winding 24. In the illustrated embodiment, the stator 20 has a 3-phase design with three essentially electromagnetically-independent power windings 22 (the phases are denoted by the circled numerals 1, 2, 3, respectively in FIG. 2) and, correspondingly, a control winding(s) 24 is provided (the number of control windings may or may not equal the number of power windings, as will be discussed further below). The power windings 22 and control windings 24 are separated in this embodiment by a winding air gap 26 and are disposed in radial slots 28, divided into slot portions 28a and 28b, provided in the stator 20 between adjacent teeth 30. For ease of description, the adjacent slots 28a, 28b are indicated in FIG. 2 as A, B, C, D, etc. The power windings 22 are electrically insulated from the control windings 24. A back iron 32, also referred to as the control flux bus 32 in this application, extends between and at the bottom of the slots 28b. A rotor air gap 34 separates rotor 12 and stator 20 in a typical fashion.

A core or "bridge" portion, also referred to as the "power flux bus" 36 portion of stator 20 extends between adjacent pairs of teeth 30 in slot 28 to form the two distinct slots 28a and 28b. The first slots 28a hold the power windings 22 only, and the second slots 28b hold both the power windings 22 and control windings 24.

Figure 3:
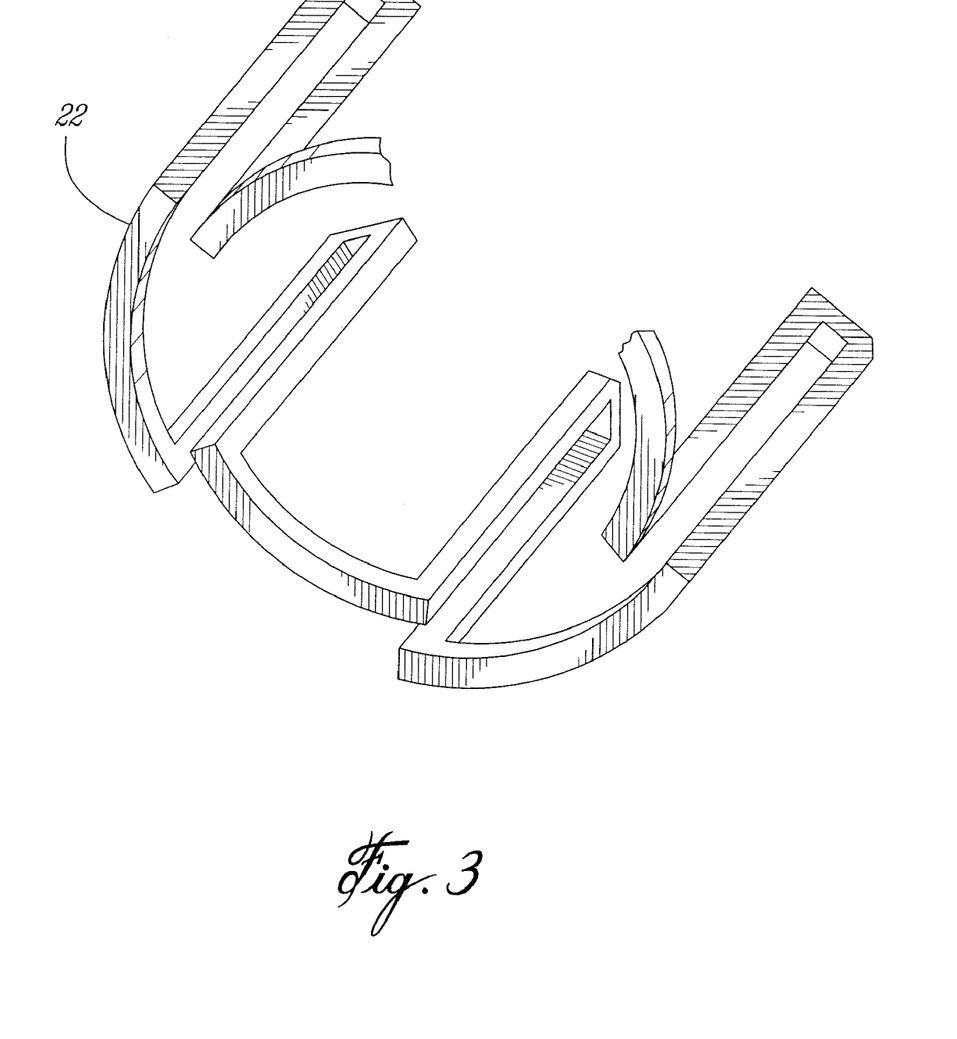
FIG. 3 is a perspective view of a partial power winding that can be used in the machine of FIG. 1.

The materials for the PM machine 10 may be any suitable. Materials preferred by the inventor are samarium cobalt permanent magnets, copper power and control windings, a suitable saturable electromagnetic material for the stator teeth and power and control flux buses, such as electrical silicon steels commonly used in the construction of magnetic machines. The stator teeth, power and control flux busses may be integral or non-integral with one another, as desired. FIG. 3 shows an example of one of the power windings 22, positioned as it would be wound in the stator in a three-phase configuration. Each of the power windings 22 in this embodiment consists of a single conductor which enters, for instance, the first slot portion 28a of a selected slot 28 (e.g. at slot "A"), extends through the slot and exits the opposite end of the slot, and then radially crosses the power flux bus 36 to enter the second slot portion 28b of the selected slot 28 (e.g. at slot "A"), after which it extends back through the length of the selected slot, to then exit the second slot portion 28b, and hence exits the slot 28 on the same side of the stator as it entered. It then proceeds to the second slot 28b portion of the next selected slot 28 (e.g. slot "D" in FIG. 2), where the power winding 22 then enters second slot 28b and passes along the slot, exits and radially crosses the power flux bus 36, and then enters the adjacent first slot portion 28a of the selected slot 28, and then travels through the slot again to exit the stator adjacent where the winding entered the selected slot 28. The power winding then proceeds to the next selected slot 28 (e.g. slot "G"), and so the pattern repeats. The power winding 22 corresponding to phase 2 (not shown), would begin in an appropriate selected slot (e.g. slot B of FIG. 2) and follow an analogous path, but is preferably wound in an opposite winding direction relative to phase 1 winding 22. That is, the phase 2 winding 22 would enter the selected slot (slot B) via slot portion 28b (since phase 1 winding 22 entered slot A via slot portion 28a, above), and then follows a similar but opposite path to the conductor of phase 1, from slot to slot (e.g. slots B, E, etc).

Similarly, the phase 3 winding 22 is preferably oppositely-wound relative to phase 2, and thus enters the selected slot (e.g. slot "C") of the stator via slot portion 28a, and follows the same general pattern as phase 1, but opposite to the pattern of phase 2, from slot to slot (e.g. slots C, F, etc). Thus, as mentioned, the phases of the power winding 22 will become oppositely-wound relative to control winding 24, as will be described further below.

Meanwhile, each control winding 24 is wrapped around the control flux bus 32, in a manner as will now be described. In this embodiment, control winding 24 preferably forms loops around the control flux bus 32 (from as few as 1 to as many as is desired by the designer—25 times is preferred in this embodiment, for reasons described below), wrapped around the control flux bus 32. The direction of winding between adjacent second slots 28b for control winding 24 is preferably the same from slot to slot, and thus alternatingly opposite relative to the power winding 22 of a same phase wound as described above, so that a substantially net-zero voltage is induced in each control winding 24, as will also be described further below. Preferably, all loops around the control flux bus 32 are in the same direction. Note that the control winding 24 does not necessarily need to be segregated into phases along with the power windings, but rather may simply proceed adjacently from slot to slot, or grouped in such other manner as desired. In one embodiment, the individual control coils may be connected in series from slot to slot, irrespective of phase, but are nonetheless segregated into groups of adjacent slots which are then connected in parallel, to optimize the total impendence of the control coil circuit. Although it is preferred to alternate winding direction of the power windings, and not alternate direction of the control windings, the important thing in that the power and control windings are wound in relative directions to ensure a substantially net-zero voltage is induced in each control winding 24 as a result of current flow in the power windings 22. If the control coil is segregated into phase correspondence with power windings 22, for example to reduce its inductance by a series parallel arrangement, it is important that there are an even number of slots of a given phase in which the power winding and control winding are in opposite directions, to yield the desired induced net-zero voltage in control winding 24.

The/each control winding 24 is connected to a variable output current source 50 (see FIG. 4), which in this example includes a variable current DC source and an appropriate solid state control system preferably having functionality as described further below. If there is more than one control winding 24, each control winding 24 can be connected to the same current source 50, or connected to a respective one. The approximate current required from such source is defined by the power winding output current required, divided by the ratio of the number of turns between the power winding and the control winding.

Figure 4:
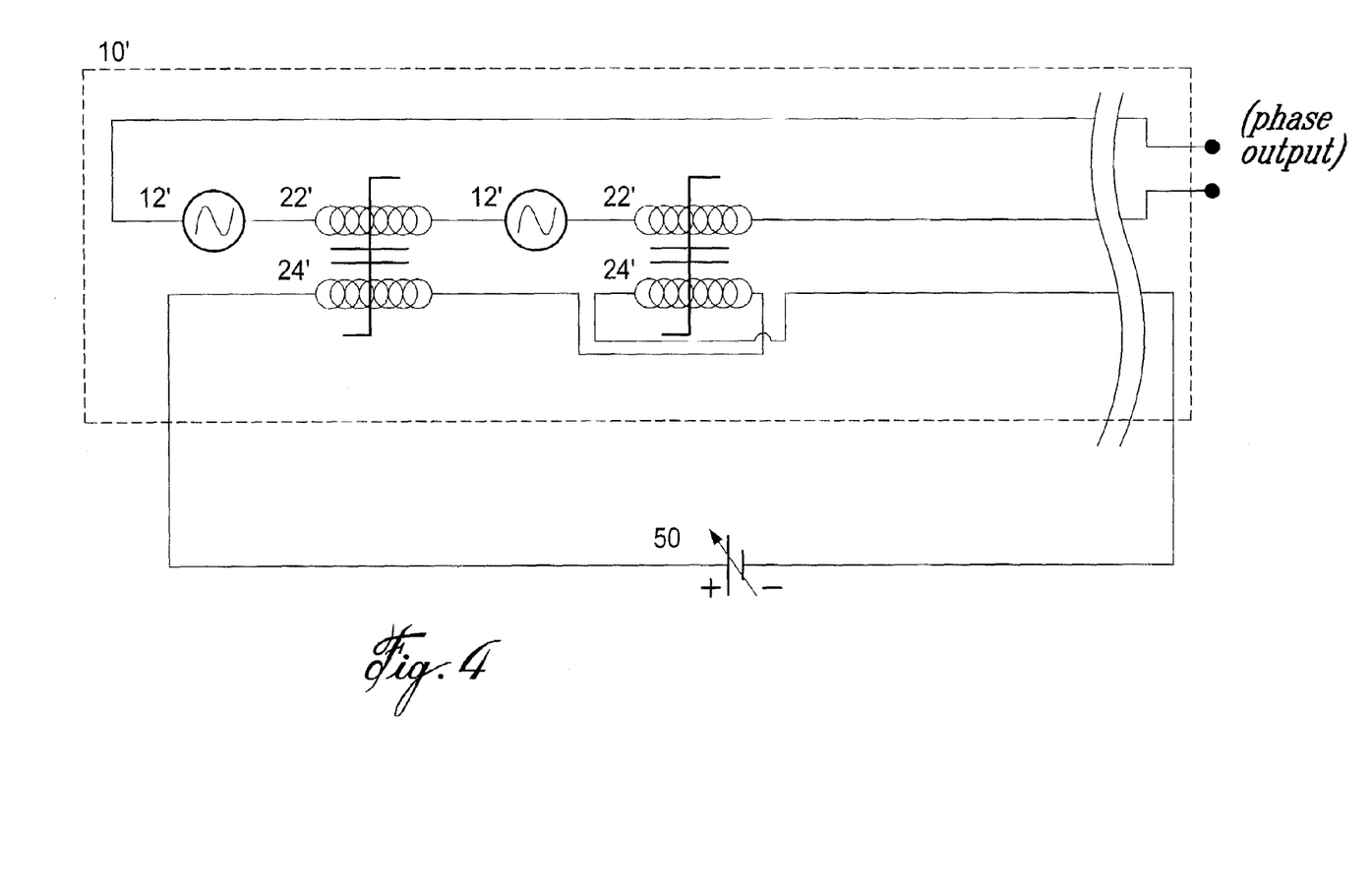
FIG. 4 is a schematic view of a partial equivalent circuit of the alternator/motor machine of FIG. 1, illustrating its functional aspects.

Referring to FIG. 4, the machine 10 as just described can also be represented schematically by an equivalent circuit 10' having a plurality of alternating current sources 12' (i.e. each, equivalent to the moving magnetic rotor system in conjunction with the portion of a power winding 22 located in the first slot 28a) connected to a plurality of power inductors 22' (i.e. equivalent to the portion of the primary winding 22 located in the second slot 28b), the current sources 12' and power inductors 22' arranged alternately in series. Associated with power inductors 22' are a plurality of control inductors 24' (i.e. equivalent to control winding 24) having saturable cores 32' (equivalent to the saturable control flux bus 32). Control inductors 24' are connected to a variable DC current source and control system in this example, represented by 50. Therefore, one can see that the primary winding 22, the control winding 24 and the control flux bus 32 co-operate to provide a saturable core inductor within the stator 12. The saturable core inductor in conjunction with a second and third effect in this arrangement, to be described further below, provides an integrated approach to implementing a regulation scheme of this generic type, as will be further described.

Referring again to FIG. 2, when the machine 10 is used in an alternator mode, rotor 12 is moved relative to stator 20. The interaction of magnets 14 and the power winding 22 creates a primary magnetic flux within PM machine 10 along a primary magnetic flux path or magnetic circuit 60. The primary flux induces a voltage in the power winding 22, which when an electrical load is connected results in an induced current, and the induced current causes a secondary magnetic flux to circulate an adjacent secondary magnetic flux path or magnetic circuit 62. The primary circuit 60 and the secondary circuit 62 are thus coupled when a current flows in the power winding 22. The secondary magnetic circuit 62 is for the most part isolated from the rotor 12 and the primary magnetic circuit 60. It is to be understood that this description applies only to phase "1" of the 3-phase illustrated embodiment, and that similar interactions, etc. occur in respect of the other phases.

Primary magnetic circuit 60 includes rotor 12, rotor air gap 34, power flux bus 36 and the portion of stator teeth 30 between rotor 12 and power flux bus 36. Primary magnetic circuit 60 encircles a portion of the power winding 22 and, in use as an alternator, causes a current flow in the power winding 22. Secondary magnetic circuit 62 includes power flux bus 36, control bus 32 and the portion of stator teeth 30 between control bus 32 and power flux bus 36. In this embodiment, the secondary magnetic circuit 62 encircles the portions of the power winding 22 and the control winding 24 in the second slot 28b. The primary magnetic circuit 60 encircles the first slot 28a while the secondary magnetic circuit 62 encircles the second slot 28b. The first slot 28a is preferably radially closer to the rotor 12 than the second slot 28b. Power flux bus 36 is preferably common to both the primary and secondary magnetic circuit paths and thus the primary and secondary magnetic circuits are coupled, as mentioned.

A tertiary magnetic circuit 64 preferably circulates around control bus 32, as partially indicated in FIG. 2 (i.e. only a portion of the tertiary circuit is shown, as in this embodiment the tertiary circuit circulates through the entire stator 20). The control flux bus 32 is preferably common to both the secondary and tertiary magnetic circuit paths and thus the secondary and tertiary magnetic circuits are magnetically coupled. At least a portion of control flux bus 32 is saturable by the flux density of the tertiary magnetic circuit.

When operated as an alternator, the machine 10 permits the output of the power winding(s) 22 to be controlled through a manipulation of current supplied to the control winding(s) 24, as will now be described.

As explained above, the equivalent power inductor 22' is formed by the portion of the power winding 22 in the second slot 28b and the secondary magnetic circuit 62, as schematically represented by the equivalent circuit of FIG. 4. The control winding 24 shares the secondary magnetic circuit 62, however since it is preferably wound in the same direction around the control flux bus 32 in each second slot 28b, as mentioned above, the resulting effect achieved is similar to that provided by alternatingly reversed saturable inductors, and there is preferably substantially no net voltage generated within the control winding 24 by flux in the secondary magnetic circuit 62.

The application of a DC current from the source 50 to the control winding 24 results in a DC flux circulating circuit 64 in the control flux bus 32. At the instant in time depicted in FIG. 2, it can be seen that the DC flux in tertiary magnetic circuit 64 in the control flux bus 32 is in the same direction in slot A as the AC flux in secondary magnetic circuit 62, but in slot D the direction of the DC flux in tertiary magnetic circuit 64 in the control flux bus 32 is opposite to the AC flux in secondary magnetic circuit 62. As the DC current is increased in the control winding 24, the flux density in the control bus 32 is increased such that the saturation flux density is eventually reached. It will be understood that saturation is reached first in the regions in the control flux bus 32 where the AC flux and the DC flux are in the same direction, and that at higher DC control currents both regions of the control flux bus 32 become saturated regardless of flux direction, if the current in the main phase winding is not sufficient to prevent saturation in the areas where the flux is in opposite directions. If the current in the main windings is increased above the point where saturation of both regions is achieved, one of the regions will come out of saturation. Once saturation occurs, the AC flux in the secondary magnetic circuit 62 due to the current in the power winding 22 is very significantly reduced.

As mentioned, the winding pattern of the control winding 24 relative to the power winding 22 preferably results in a near net zero voltage induced in the control winding 24, which simplifies control. Also, since the DC control current through the control flux bus 32 produces magnetic fluxes in different directions relative to the power winding 22, one section of the control flux bus 32 will saturate more in one cycle of the AC power while another section of the control flux bus 32 will saturate more in the other, thus tending to equalize the control action through each half-cycle.

Once saturated, magnetic materials substantially lose their ability to conduct magnetic flux, and as such appear to be almost non-magnetic to both AC magnetic forces ($H_{AC}$) and further changes in DC magnetic influence ($H_{DC}$). The net effect of this saturated condition in the control flux bus 32 is thus to virtually eliminate the inductance due to the secondary magnetic circuit 62, which thereby significantly reduces inductance of the machine 10.

Furthermore, as the current flow in the power winding 22 increases, for example due to an increase in the external load or an increase in the generated output voltage due to an increase in operating speed, the portion of the control flux bus 32 in which the flux directions are instantaneously opposing will become less saturated, which causes a proportional increase in the inductance. This effect tends to cause the output current to remain somewhat constant. Thus, power output current of the alternator to become a function of the control current. The maximum inductance of the equivalent power inductor 22' formed by the secondary magnetic circuit 62 is related to the physical dimensions and materials of the stator portions carrying the secondary magnetic circuit 62. The power winding current limit is related to the current in the control winding by:

$$I_P = K + (I_C * N_C / N_P)$$

where: $N_P$ and $N_C$ are the number of turns in the power and control windings, respectively, $I_P$ and $I_C$ are the currents in the power and control windings, respectively, and K is a constant which is inversely proportional to the maximum inductance of the power winding and other machine design features.

This permits manipulation of the output of power winding 22, and thus control winding 24 may be used as a source of control of PM machine 10. Means for controlling the operation of PM machine 10 are thus available within the machine itself, as the "control" current may be generated by the power windings 22 of the PM machine 10, typically in conjunction with rectifiers. In some instances, an external source of control current may be required in conjunction with an electronic current control, although arranging the control winding 24 in series with the rectified output current may also be used to control current to some extent. The architecture therefore lends itself to many novel possibilities for control systems for the machine 10, a few examples of which will now described.

For example, the output (i.e. from a power winding 22) of alternator 10 may be controlled by connecting the control winding 24 to a power supply 50, and a current applied to the control winding 24 preferably sufficient to fully saturate the control flux bus 32, such saturation being caused by magnetic flux flowing along tertiary path 64 induced by current passing though control winding 24, which is wrapped around control flux bus 32 in this embodiment. When saturation occurs, AC flux around the secondary magnetic circuit 62 is effectively eliminated, and the magnetic relationship between the power winding 22 and the secondary magnetic circuit 62 is such that inductance in the power winding 22 is virtually eliminated. Thus, more current is permitted to flow in the power winding 22. Therefore, the current level provided by controlled current source supply 50 can be continuously varied, as required, to regulate the output current of the power winding 22 (and thus, ultimately, output voltage) over a range of rotor speeds and electrical loads. In order to effect constant output voltage control, for example, a feedback control circuit is used by the control system of source 50 to compare the alternator output voltage (i.e. the output of power winding 22) to a fixed reference (e.g. representative of a desired output voltage level(s)), and control can be configured such that, when the alternator output voltage is less than a desired reference level, a command is provided to increase the control current to increase saturation level and therefore output current, and thus the output voltage.

Magnetic flux preferably circulates the tertiary magnetic circuit 64 in the same direction around the control flux bus 32. As mentioned above, although the control winding 24 is provided in the second slots 28b corresponding to a particular phase of the three-phase machine described, the power windings 22 are wound in the opposite direction in each first slot 28a which is due to the opposite polar arrangement of the magnets 14 associated with each adjacent first slot 28a of the phase. To ensure that a uniform direction for the tertiary magnetic circuit 64 is provided, as mentioned, the control windings 24 are preferably wound in the same direction in all second slots 28b. Also as mentioned, a net-zero voltage is induced in the control winding 24, which is desirable because a relatively low DC potential is then required to provide DC control currents, thus no special considerations are required to remove a significant AC potential on the control winding 24.

Figure 5:
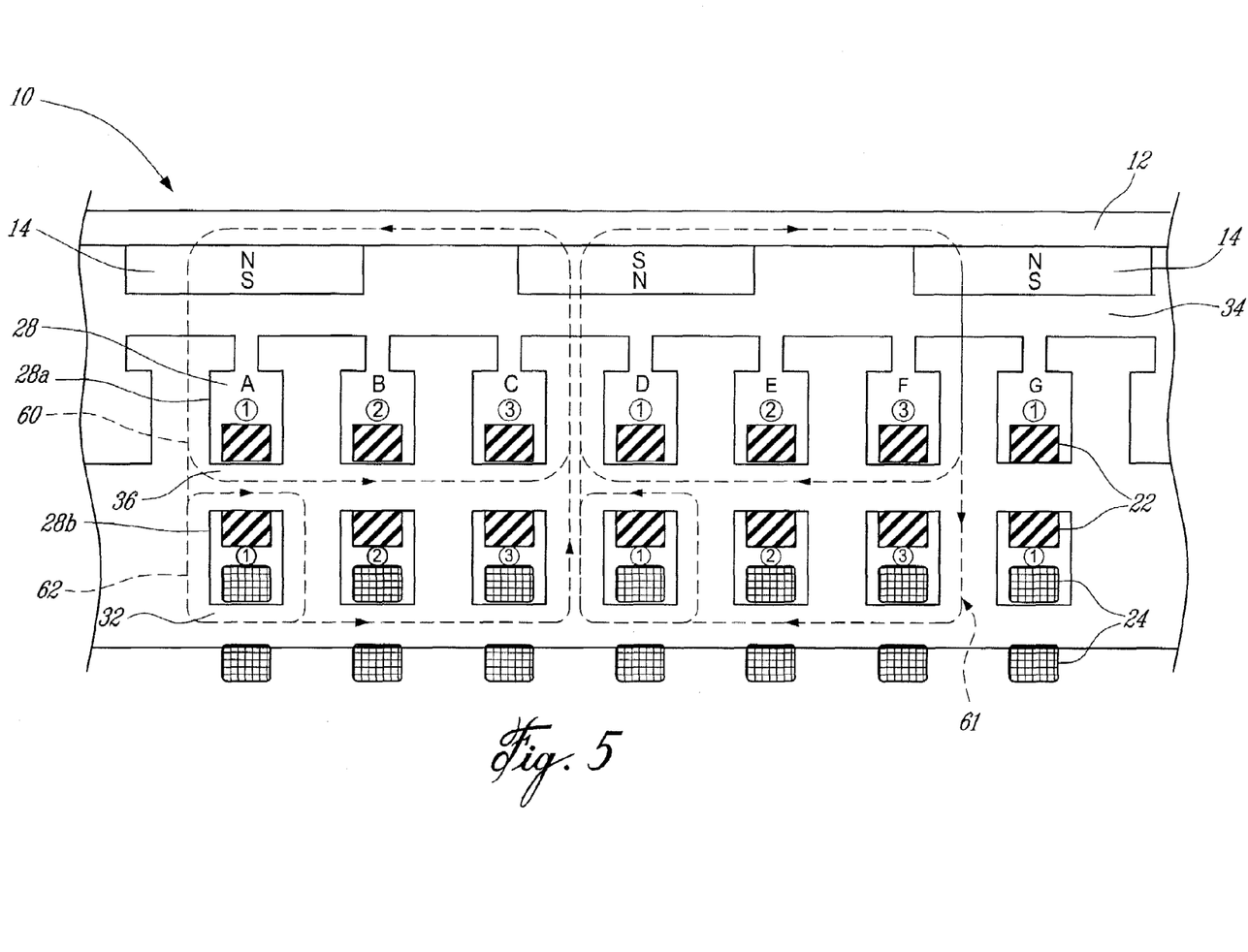
FIG. 5 is a view similar to FIG. 2, showing an example of the machine during a low or no-load condition.

The skilled reader will appreciate, in light of this disclosure, that it may be desirable in many situations to include a regulation apparatus, for instance a shunt regulator circuit dissipating electrical power outside the normal load circuit, to maintain a minimum current in the power windings 22 during a low or no-load condition when the machine 10 operates as an alternator. However, such regulation apparatus tends to add weight and complexity, and is therefore undesirable for this reason. With the present architecture of the machine 10, the designer may instead select the rotor and stator physical dimensions and/or materials to yield the desired machine performance under the low or no-load condition, and thereby dispense with the need for a shut regulator or similar system, or reduce the complexity of such a system. To do so, the machine 10 is designed, as described further below, such that a portion of the flux in the first magnetic circuit 60 is automatically diverted during the low or no-load conditions, to loop through the control bus 32 and around at least one of the second slot 28b in which a portion of the power winding 22 and a portion of the control winding 24 are disposed, as shown in FIG. 5. The diverted portion of the flux tends to induce a voltage in the second portion of the power winding 22, which voltage subtracts to a voltage induced in the first portion of the power winding 22.

By appropriately setting the relative permeability (or reluctance) of the primary magnetic circuit versus a branch magnetic circuit portion 61 defined the stator, the amount of flux which tends to loop through the control bus at low- or no-load conditions can be controlled, which can be used to define the output voltage of the machine under no-/low-load conditions, as will now be described. Permeability is determined by the relative cross-sections, magnetic path lengths, and materials of the two magnetic circuits, as will be discussed further below.

Referring still to FIG. 5, the electrical load to which the primary windings 22 is reduced, the current level in the control windings 24 is decreased as well by a electronic control circuit arranged to regulate the output voltage of the system. In the case where the load on the primary windings circuit reduces towards zero current, the control current is reduced towards zero as well (and so, too, does magnetic flux circulating along path 64, which is why flux 64 is no longer shown in FIG. 5), and the permeability of the control flux bus 32 increases, since the control flux bus 32 is not saturated. This increase in permeability tends to result in a portion of the AC flux in the primary magnetic circuit (developed by the moving permanent magnets on the rotor) branching off from the main primary magnetic circuit path, through the power flux bus, to instead loop through the control flux bus before rejoining the main primary circuit path once again, as depicted by dotted line 61 in FIG. 5. Thus, the primary magnetic circuit has two branches. The flux passing through branch 61 tends to induce a voltage in the power windings 22 which is opposite in direction to the voltage induced in the power windings 22 by flux flowing through the main branch of the primary magnetic circuit, and thus the voltage induced by flux in branch 61 subtracts from the voltage generated in the power windings by the flux in the power bus. In addition to this subtractive effect, the voltage induced in the power windings 22 also tends to be decreased merely because the flux passing through the main path of the primary magnetic circuit is reduced, as a result of part of the flux from the magnets being diverted to the control bus through branch 61. Both of these effects, together, tend to reduce the voltage generated in the power windings 22 by the magnets when the control current is set to a low or zero value (i.e. when the output current demand is low). How much flux branches off from the main flux path to circulate through the branch 61 is dependent on the relative permeabilities of the two branches of the primary magnetic circuit.

According to an aspect of the present invention, by design the dimensions, materials, etc. of the stator may be selected to set the relative permeabilities of the two branches of the primary circuit such that the power windings 22 have an output voltage under low-/no-load conditions (i.e. with little or no control current) which is set to a pre-determined desired level—preferably approximately equal to the full load output voltage (i.e. with full control current). Thus, the dimensions of the stator can be selected to balance the low/no load effect of voltages induced by the two branches of the magnetic circuit when control current is substantially zero, to thereby yield the desired output voltage in the power windings. If a particular design yields a no-load output voltage in power winding 22 which is too high relative to the desired level, the stator design dimensions can be set to provide increased permeability to the branch 61, relative to the main path of the primary magnetic circuit, to thereby induce a larger counter-voltage effect, and thus attenuate the no-load output voltage in the power windings. Conversely, if the no-load output voltage in power winding 22 is too low relative to the desired level, the stator dimensions can be configured to compensate. In practice, since the teeth 30 are common to both paths, the relative permeabilities of the two branches is more simply adjusted by adjusting the relative properties of the power flux bus 36 relative to the control flux bus 32. Alternately, a stepped or changing cross-section tooth can be provided. Many other possibilities also exist.

A suitable design can be achieved by designing the power flux bus to approach saturation at low power winding currents, which results in some of the rotor flux branching to branch 61 to circulate through the control bus 32. The flux density in the power flux bus 36 naturally increases at low main winding currents and decreases at higher main winding currents, as will be appreciated by one skilled in the art.

As can be appreciated, reducing the saturation of the magnetically saturable portion as the output current of the machine 10 reduces towards zero during a low or no-load condition can be used to prevent an output voltage of the machine 10 from rising above a threshold value during the low or no-load condition. This can greatly simplify the electronics required to regulate the output of the machine 10. The present technique thereby offers an intrinsic low/no-load voltage regulation, achieving a better regulation system with fewer/simpler electronics, and potentially removes the need for a shunt regulator circuit.

The above description is therefore meant to be exemplary only, and one skilled in the art will recognize that other changes may also be made to the embodiments described without departing from the scope of the invention disclosed. For example, the machine may be single or multi-phase, single or multi-channel (see, for example, applicant's U.S. Pat. No. 6,965,183 which discloses a multi-channel architecture concept which, when modified in accordance with the present teachings, provides a suitable multi-channel machine according to the present invention). The windings may have single or multiple turns per slot, the number of turns of a winding not necessarily has to be a whole number. The number of power windings does not necessarily have to equal the number of control windings, and one or more windings may perhaps be present in a slot. The windings may be any conductor(s) (i.e. single conductor, more than one wire, insulated, laminated, Litz etc.) or may be superconductors. In multiphase machines, there may be delta or Y-connected windings in accordance with known techniques. There need not be an air gap between the power and control windings, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and the ones described above need not be used at all, or throughout the apparatus. Also, the magnetic circuits described can be arranged in the stator (and/or rotor) in any suitable manner. Likewise, the stator and rotor may also have any suitable configuration. Any suitable saturation means may be used. Although a DC source is preferred for control of saturation in some embodiments described above, an AC source may also be used in certain circumstances to achieve desired results, as the skilled reader will understand.

The 'low' load situation can be interpreted as a situation where the electrical capacity of the machine 10 is far greater than the electrical power that it must provide at the moment. The 'no-load' situation may include a situation where the machine 10 is disconnected from the load, either on-purpose or not, or electrical load(s) are turned off.

Still other modifications which fall within the scope of the present invention will be apparent to those skilled in the art, in light of a review of this disclosure, and such modifications are intended to fall within the appended claims. In this application, it is to be understood that the term 'alternator' is sometimes used generically to mean a device used for generating electricity, and is not always intended therefore to be limited to a device for generating an output alternating current.

What is claimed is:

1. A method of controlling an output voltage in a machine operable as an electric alternator/generator, the machine comprising a rotor and stator assembly, the assembly having a stator including at least a first winding, the assembly also having first and second magnetic circuits and a saturation control device, the first magnetic circuit including the rotor and encircling at least a first portion of the first winding, the second magnetic circuit encircling at least a second portion of the first winding remote from the first magnetic circuit, the first and second magnetic circuits coupled when current flows in the first winding, the second magnetic circuit including a portion which is selectively magnetically saturable, the saturation control device being operatively associated with the magnetically saturable portion of the second circuit and operable to controllably vary a saturation level of said saturable portion, the method comprising:

reducing the saturation of the magnetically saturable portion as an output current of the machine reduces towards zero during a low or no-load condition;

preventing an output voltage of the machine from rising above a threshold value during the low/no-load condition by allowing sufficient flux to leave the first magnetic circuit and circulate through the magnetically saturable portion when in an unsaturated condition to induce a reducing voltage in second portion of the first winding subtractive from the output voltage.

2. The method of claim 1 wherein the step of preventing includes allowing some of the first magnetic circuit to circulate into the magnetically saturable portion by selecting relative permeabilities of the stator so as to direct sufficient flux through the saturable portion to induce a sufficient reducing voltage to limit the output voltage to said threshold value.

3. The method of claim 2, wherein a relative dimension of at least one stator portion remote from the first circuit is selected to reduce a permeability of the stator relative to the first magnetic circuit and thereby promote flux circulation through the magnetically saturable portion when unsaturated in the low/no-load condition.

4. The method of claim 3, wherein the at least one stator portion is the magnetically saturable portion.

5. The method of claim 2, wherein at least one material of at least one stator portion remote from the first circuit is selected to reduce a permeability of the stator relative to the first magnetic circuit and thereby promote flux circulation through the magnetically saturable portion when unsaturated in the low/no-load condition.

6. The method of claim 5, wherein the at least one stator portion is the magnetically saturable portion.

7. A method of providing an electric alternator, the method comprising:
   providing an alternator having a rotor, a stator and at least a first winding providing alternator output power, the stator having a plurality of first slots and second slots circumferentially around the stator, the first slots located closer to the rotor than the second slots, the first slots having a portion of the first winding disposed therein, the second slots having another portion of the first winding disposed therein, the stator defining a first magnetic circuit path around the first slots and a second magnetic path around the second slots, the first magnetic circuit path in use conducting rotor magnetic flux to induce a first voltage in the first winding, the second magnetic circuit path in use conducting rotor magnetic flux to induce a second voltage in the first winding, the second voltage opposite in direction to the first voltage, the stator having first and second magnetic permeabilities associated with the first and second magnetic circuit paths;
   determining a maximum allowable output voltage of the alternator mode when operating under a low or no-load condition;
   configuring the stator by selecting relative permeabilities of the first and second magnetic circuits such that in use the induced second voltage is sufficient large relative to the induced first voltage so as to prevent the first voltage from exceeding the maximum allowable output voltage.

8. The method of claim 7, wherein the step of configuring includes adjusting the relative dimensions of stator portions defining the first and second magnetic circuit paths.

9. The method of claim 7, wherein the step of configuring includes adjusting the relative materials of stator portions defining the first and second magnetic circuit paths.

10. The method of claim 7, wherein the second circuit branches from the first circuit, and the method further comprises the step of diverting a portion of the magnetic flux circulating the first circuit to the second circuit.

11. An electric alternator comprising a rotor, a stator and at least a first stator winding providing alternator output power to a load, the stator having a plurality of first slots and second slots circumferentially around the stator, the first slots located closer to the rotor than the second slots, the first slots having a portion of the first winding disposed therein, the second slots having another portion of the first winding disposed therein and wound oppositely relative to the portion in the first slots, the stator defining a first magnetic circuit path around the first slots and a second magnetic circuit path around the second slots, the second path outside of the first magnetic circuit path, the first magnetic circuit path adapted to conduct rotor magnetic flux to induce a first voltage in the first winding, the second magnetic circuit path adapted to conduct rotor magnetic flux to induce a second voltage in the first winding, the second voltage opposite in direction to the first voltage, the stator having first and second magnetic permeabilities associated with the first and second magnetic circuit paths, the relative permeabilities selected such that in use the induced second voltage is sufficiently large relative to the induced first voltage so as to prevent the first voltage from exceeding a pre-determined maximum allowable output voltage.

12. The alternator of claim 11 wherein the pre-determined maximum allowable output voltage is substantially equal to a full load output voltage of the first winding.

13. The alternator of claim 11 further comprising a second winding disposed in the second slots, the second winding coiled around a stator portion remote from the first magnetic circuit and defining a portion of the second magnetic circuit, the second winding connected to a current source and in use adapted to selectively energize the second winding to saturate said stator portion, said stator portion being unsaturated in a "no-load" condition when substantially no current is drawn from the first winding by the load, and wherein during in this "no-load" condition the induced second voltage is sufficiently large relative to the induced first voltage so as to prevent the first voltage from exceeding a pre-determined maximum allowable output voltage.

* * * * *